(12) United States Patent
Lee et al.

(10) Patent No.: US 11,525,108 B2
(45) Date of Patent: Dec. 13, 2022

(54) BEVERAGE MAKER

(71) Applicant: LG ELECTRONICS INC., Seoul (KR)

(72) Inventors: Kyungbin Lee, Seoul (KR); Shic Yoon, Seoul (KR); Daewoong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 296 days.

(21) Appl. No.: 15/931,823

(22) Filed: May 14, 2020

(65) Prior Publication Data

US 2020/0362283 A1  Nov. 19, 2020

(30) Foreign Application Priority Data

May 17, 2019  (KR) .......................... 10-2019-0058367

(51) Int. Cl.
   *C12C 13/10*  (2006.01)
(52) U.S. Cl.
   CPC .................................... *C12C 13/10* (2013.01)
(58) Field of Classification Search
   CPC ...................................................... C12C 13/10
   See application file for complete search history.

(56) References Cited

U.S. PATENT DOCUMENTS

| 3,130,909 | A | * | 4/1964 | Sanborn | .............. | A01M 7/0014 |
| | | | | | | 239/597 |
| 4,167,146 | A | * | 9/1979 | Wirth | ...................... | F23G 5/245 |
| | | | | | | 110/259 |
| 2016/0090943 | A1 | * | 3/2016 | Johnson | ................. | F02M 25/00 |
| | | | | | | 29/890 |
| 2017/0335257 | A1 | * | 11/2017 | Chong | .................... | C12C 13/00 |

FOREIGN PATENT DOCUMENTS

| KR | 10-2017-0071343 | 6/2017 |
| KR | 10-2018-0065551 | 6/2018 |
| KR | 10-2018-0133740 | 12/2018 |

OTHER PUBLICATIONS

Korean Office Action dated Dec. 23, 2020 issued in Application No. 10-2019-0058367.

\* cited by examiner

*Primary Examiner* — Dana Ross
*Assistant Examiner* — Kuangyue Chen
(74) *Attorney, Agent, or Firm* — KED & Associates (57) ABSTRACT

A beverage maker may include a fermenter having an opening, a fermentation lid configured to cover the opening of the fermenter, a gas discharge channel configured to communicate with an inside of the fermenter, a gas discharge valve connected to the gas discharge channel, and a gas discharge end fitting through which a gas passing through the gas discharge valve passes and which is provided with a mesh.

10 Claims, 2 Drawing Sheets

BEVERAGE MAKER

CROSS-REFERENCE TO RELATED APPLICATION(S)

The present application claims priority under 35 U.S.C. 119 and 35 U.S.C. 365 to Korean Patent Application No. 10-2019-0058367, filed in Korea on May 17, 2019, which is hereby incorporated by reference in its entirety.

BACKGROUND

1. Field

A beverage maker is disclosed herein.

2. Background

Beverages are collectively referred to as drinkable liquids, such as alcohol or tea. For example, beverages may be divided into various categories, such as water (a beverage) to solve thirst, juice beverages with unique flavor and taste, refreshing beverages giving a refreshing sensation, favorite beverages with an arousal effect, or alcoholic beverages with an alcohol effect.

Representative examples of such a beverage is beer. The beer is an alcoholic beverage made by making juice of malt sprouting from barley, filtering the juice, adding hop, and fermenting the juice using the yeast.

Consumers may purchase ready-made products made and sold by a beer maker or make beer at home (hereinafter "homemade" beer) by directly fermenting beer ingredients at home or in a bar. Homemade beer may be made in a variety of types and may be made to suit a consumer's taste.

The ingredients for making beer may include water, malt, hop, fermentation accelerators, and flavoring additives, for example. The fermentation accelerators, which are called yeast, may be added to malt to ferment the malt and help to produce alcohol and carbonic acid. The flavor additives are additives that enhance the taste of beer, such as fruit, syrup, and vanilla beans, for example.

Generally, homemade beer may include three stages or operations, namely, a wort stage or operation, a fermentation stage or operation, and an aging stage or operation, and it may take about two to three weeks from the wort stage or operation to the aging stage or operation. It is important for the homemade beer to maintain an optimum temperature during the fermentation operation, and the easier the beer is to make, the more user convenience is improved.

Recently, a beverage maker capable of easily making beer at home or in a bar has been gradually used. It is preferable that such a beverage maker be capable of safely and easily making beer.

BRIEF DESCRIPTION OF THE DRAWINGS

Embodiments will be described in detail with reference to the following drawings in which like reference numerals refer to like elements, and wherein.

DETAILED DESCRIPTION

Hereinafter, embodiments will be described with reference to the accompanying drawings. Wherever possible, the same or like reference numerals have been used to indicate the same or like elements and repetitive disclosure has been omitted.

Although beer is exemplified as a beverage made using a beverage maker according to embodiments, a kind of beverage capable of being made using the beverage maker is not limited to beer. For example, various kinds of beverages may be made using the beverage maker according to embodiments.

Figure 1:
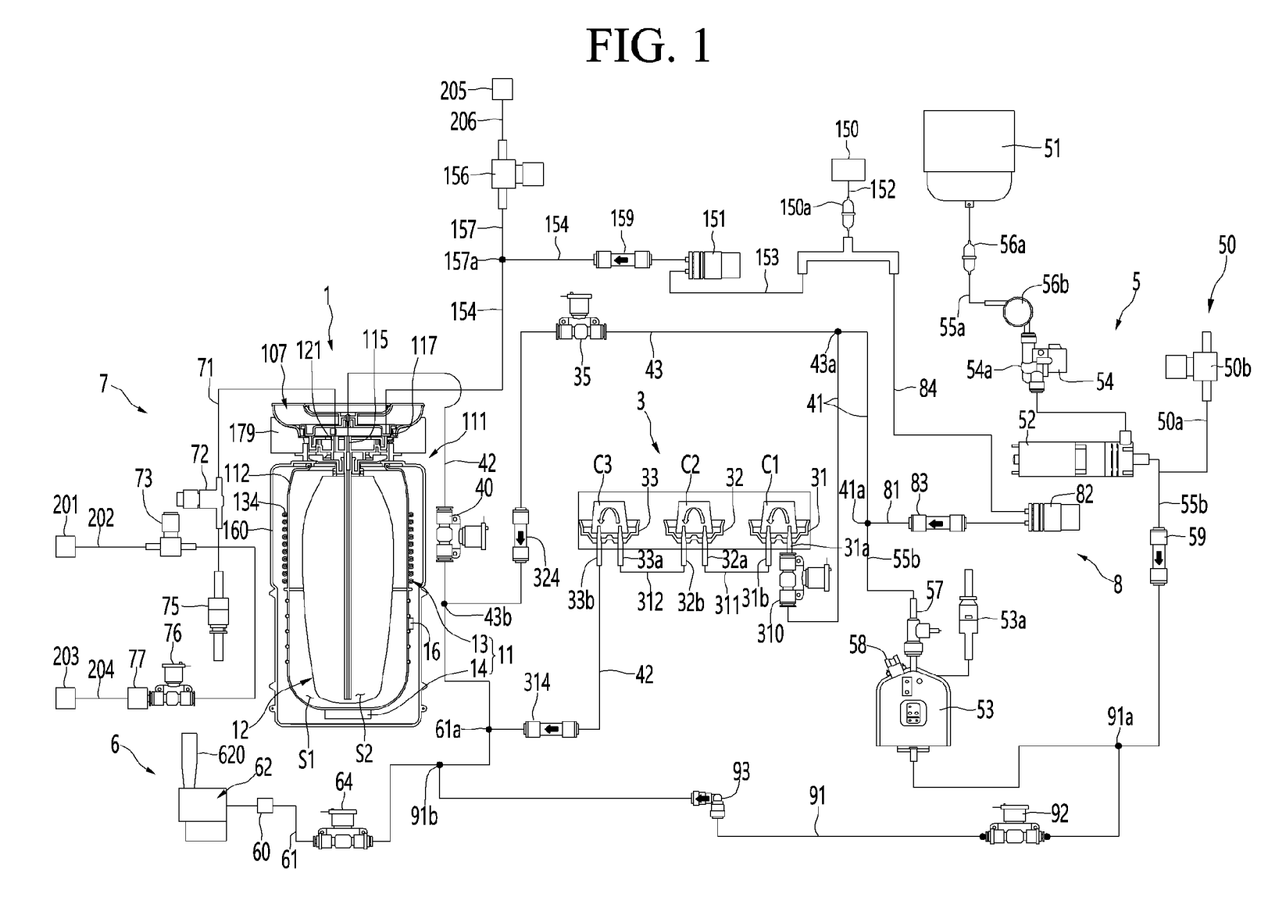
FIG. 1 is a schematic view of a beverage maker according to an embodiment.

FIG. 1 is a schematic view of a beverage maker according to an embodiment. The beverage maker may include a fermentation module 1. A beverage may be fermented in the fermentation module 1. The beverage maker may include a temperature controller that controls an inner temperature of the fermentation module 1.

The beverage maker may include a fluid supply module 5. The fluid supply module 5 may supply a fluid, such as water.

The beverage maker may include ingredient supplier 3 provided with ingredient accommodation portions 31, 32, and 33 in which ingredients required for making a beverage may be accommodated. The beverage maker may include main channels 41 and 42 that connect the fluid supply module 5 to the fermentation module 1.

The beverage maker may include a beverage dispenser 6 that dispenses the beverage made in the fermentation module 1 to the outside. The beverage dispenser 6 may be connected to second main channel 42. Thus, the beverage dispensed from the fermentation module 1 may be guided to the beverage dispenser 6 by passing through a portion of the second main channel 42.

The beverage maker may further include a gas discharger 7. The gas discharger 7 may be connected to the fermentation module 1 to discharge a gas generated while the beverage is made.

The beverage maker may further include an air injector 8 that injects air. The air injector 8 may be connected to the fluid supply module 5 or first main channel 41. The air injector 8 may include an air injection pump 82.

The beverage maker may further include an air controller 15 that controls a pressure between an inner wall of a fermenter 112 and an outer surface of a fermentation container 12.

The beverage maker may further include a sub channel 91. The sub channel 91 may connect the fluid supply module 5 to the beverage dispenser 6.

The beverage maker may further include an air removal module 50 that removes air within a supply pump 52 of the fluid supply module 5.

Hereinafter, the fermentation module 1 will be described. The fermentation module 1 may include a fermenter module 111 having an opening 170 and fermentation lid 107 that opens and closes the opening 170. The fermenter module 111 may include a fermentation case 160 and fermenter 112 accommodated in the fermentation case 160 and having an inner space S1. An insulation portion (not shown) may be provided between the fermentation case 160 and the fermenter 112. The fermenter module 111 may further include a lid seating body 179 on which the fermentation lid 107 may be seated.

Each of the fermentation case 160 and the fermenter 112 may be provided as an assembly of a plurality of members or components. The fermentation case 160 may define an outer appearance of the fermenter module 111.

The fermentation lid 107 may seal an inside of the fermenter module 111 and be disposed on the fermenter module 111 to cover the opening. A main channel, particularly, a main channel connection portion 115 connected to the second main channel 42 may be provided in the fermentation lid 107.

The fermentation container 12 may be accommodated in the fermenter 112. The fermentation container 12 may be provided as a separate container so that beverage ingredients and a made beverage do not stain the inner wall of the fermenter 112. The fermentation container 12 may be reparably disposed on or in the fermenter 112. The fermentation container 12 may be seated on the fermenter 112 to ferment the beverage within the fermenter 112. After the fermentation container 12 is used, the fermentation container 12 may be withdrawn or removed from the fermenter 112.

The fermentation container 12 may be a pack containing ingredients for making a beverage. The fermentation container 12 may be made of a flexible material. Thus, the fermentation container 12 may be easily inserted into the fermenter 112 and be contracted and expanded by pressure. However, embodiments are not limited thereto. For example, the fermentation container 12 may be made of a polyethylene terephthalate (PET) material.

The fermentation container 12 may have a beverage making space S2 in which beverage ingredients may be accommodated, and a beverage made. The fermentation container 12 may have a size less than a size of the inner space S1 of the fermenter 112.

The fermentation container 12 may be inserted into and accommodated in the fermenter 112 in a state in which the ingredients are contained in the fermentation container 12. The fermentation container 12 may be inserted into the fermenter 112 and then accommodated in the fermenter 112 in a state in which the fermentation lid 107 is open.

The fermentation lid 107 may seal the fermenter 112 after the fermentation container 12 is inserted into the fermenter 112. The fermentation container 12 may assist fermentation of ingredients in the state in which the fermentation container 12 is accommodated in the space S1 sealed by the fermenter 112 and the fermentation lid 107. The fermentation container 12 may be expanded by the pressure therein during the making of the beverage. When air is supplied between the inner wall of the fermenter 112 and the outer surface of the fermentation container 12, the fermentation container 12 may be compressed by an inner pressure of the fermenter 112, and the beverage contained in the fermentation container 12 may be taken out.

The fermenter 112 may be disposed inside of the fermentation case 160. The fermenter 112 may have an outer circumference surface and a bottom surface, which may be spaced apart from an inner surface of the fermentation case 160. The outer circumference the fermenter 112 may be spaced apart from an inner circumference of the fermentation case 160, and an outer bottom surface of the fermenter 112 may be spaced apart from an inner bottom surface of the fermentation case 160.

An insulation portion (not shown) may be provided between the fermentation case 160 and the fermenter 112. The insulation portion may be disposed in the fermentation case 160 to surround the fermenter 112. Thus, a temperature of the fermenter 112 may be maintained constant. The insulation portion may be made of a material, such as foamed polystyrene or polyurethane, which has high thermal insulating performance and absorbs vibration.

The fermenter 112 may include a temperature sensor 16 that senses a temperature of the fermenter 112. The temperature sensor 16 may be mounted on a circumferential surface of the fermenter 112. The temperature sensor 16 may be disposed below an evaporator 134 wound around the fermenter 112.

Hereinafter, a temperature controller 11 will be described.

Temperature controller 11 may change a temperature of the fermenter 112. The temperature controller 11 may heat or cool the fermenter 112 to control the temperature of the fermenter 112 at an optimal temperature for fermenting the beverage.

The temperature controller 11 may include at least one of a refrigeration cycle device 13 or a heater 14. However, embodiments are not limited thereto. For example, the temperature controller 11 may include a thermoelement (TEM).

The refrigeration cycle device 13 may control the temperature of the fermenter 112. The refrigeration cycle device 13 may include a compressor, a condenser, an expansion mechanism, and the evaporator 134.

The evaporator 134 may contact an outer surface of the fermenter 112. The evaporator 134 may be an evaporation tube wound around the outer surface of the fermenter 112, for example. The evaporator 134 may be accommodated between the fermenter 112 and the insulation portion to cool the fermenter 112 which is insulated by the insulation portion.

The temperature controller 11 may further include heater 14 that heats the fermenter 112. The heater 14 may contact the bottom surface of the fermenter 112. The heater 14 may be a heat generation heater that generates heat when power is applied, for example. The heater 14 may be a plate heater, for example. Thus, natural convection of a fluid may be generated inside of the fermenter 112 by the evaporator 134 and the heater 14, and temperature distribution inside the fermenter 112 and the fermentation container 12 may be uniform.

Hereinafter, main channels 41 and 42 and a bypass channel 43 will be described.

The main channels 41 and 42 may include first main channel 41 that connects the fluid supply module 5 to the ingredient supplier 3 and second main channel 42 that connects the ingredient supplier 3 to the fermentation module 1. That is, the first main channel 41 may guide a fluid, such as water supplied from the fluid supply module 5 to the ingredient supplier 3, and the second main channel 42 may guide a mixture of the ingredients and the fluid, which are extracted from the ingredient supplier 3, to the fermentation module 1. The first main channel 41 may have one or a first end 41*a* connected to the fluid supply module 5 and the other or a second end connected to the ingredient supplier 3, more particularly, an inlet of an initial ingredient accommodation portion 31, which will be described hereinafter.

An ingredient supply valve 310 that opens and closes the first main channel 41 may be installed in the first main channel 41. The ingredient supply valve 310 may be provided in the ingredient supplier 3.

The ingredient supply valve 310 may be opened when additives accommodated in the ingredient accommodation portions 31, 32, and 33 are input to open the first main channel 41. The ingredient supply valve 310 may be opened when the ingredient accommodation portions 31, 32, and 33 are cleaned to open the first main channel 41.

The second main channel 42 may have one or a first end connected to main channel connection portion 115 of the fermentation module 1 and the other or a second end connected to the ingredient supplier 3, more particularly, an outlet 33*b* of a final ingredient accommodation portion 33, which will be described hereinafter.

A main valve 40 that opens and closes the second main channel 42 may be installed in the second main channel 42. A main check valve 314 that allows the fluid to flow from the ingredient supplier 3 to the fermentation module 1 may be installed in the second main channel 42. That is, the main check valve 314 may prevent the fluid from flowing back to the ingredient supplier 3.

The main check valve 314 may be disposed between the main valve 40 and the ingredient supplier 3 with respect to the second main channel 42. The main valve 40 may be opened when the fluid is supplied to the fermentation container 12 to open the second main channel 42. The main valve 40 may be closed while the fermenter 112 is cooled to close the second main channel 42. The main valve 40 may be opened when air is injected into the fermentation container 12 to open the second main channel 42. The main valve 40 may be opened when additives are supplied into the fermentation container 12 to open the second main channel 42. The main valve 40 may be closed to seal the inside of the fermentation container 12 during fermentation of ingredients. The main valve 40 may be closed to seal the inside of the fermentation container 12 when the beverage is aged and stored. The main valve 40 may be opened when the beverage is dispensed by the beverage dispenser 6 to open the second main channel 4. The beverage within the fermentation container 1 may pass through the main valve 40 to flow to the beverage dispenser 6.

The main channels 41 and 42 may be provided as one continuous channel when the beverage maker does not include the ingredient supplier 3. When the beverage maker includes the ingredient supplier 3, the beverage maker may further include bypass channel 43 configured to allow the fluid or air to bypass the ingredient accommodation portions 31 and 32.

The bypass channel 43 may bypass the ingredient accommodation portions 31, 32, and 33 and then be connected to the first main channel 41 and the second main channel 42. The bypass channel 43 may have one or a first end 43*a* connected to the first main channel 41 and the other or a second end 43*b* connected to the second main channel 42. The bypass channel 43 may have the one end 43*a* connected to the first main channel 41 between the fluid supply module 5 and the ingredient supply valve 310 and the other end 43*b* connected to the second main channel 42 between the main valve 40 and the ingredient supplier 3.

A bypass valve 35 that opens and closes the bypass channel 43 may be installed in the bypass channel 43. The bypass valve 35 may be opened to open the bypass channel 43 when the fluid supplied from the fluid supply module 5 is supplied to the fermentation container 12. The bypass valve 35 may be opened to open the bypass channel 43 when air injected from the air injector 8 is supplied to the fermentation container 12. The bypass valve 35 may be opened to open the bypass channel 43 when the bypass channel 43 is cleaned.

A bypass check valve 324 that allows the fluid to flow from the first main channel 41 to the second main channel 42 may be installed in the bypass channel 43. That is, the fluid may flow only from the first main channel 41 to the second main channel 42 but may not flow in the opposite direction. The bypass check valve 324 may be disposed between the bypass valve 35 and the second main channel 42 with respect to the bypass channel 43.

Hereinafter, the ingredient supplier 3 will be described.

When beer is made using the beverage maker, the ingredients for making the beer may include a fluid, such as water, malt, a fermentation facilitator, for example, yeast, hop, and a flavoring additive, for example. The beverage maker may include both the ingredient supplier 3 and the fermentation container 12. The ingredients for making the beverage may be accommodated in and divided between the ingredient supplier and the fermentation container 12. A portion of the ingredients for making the beverage may be accommodated in the fermentation container 12, and the remaining ingredients may be accommodated in the ingredient supplier 3. The remaining ingredients accommodated in the ingredient supplier 3 may be supplied to the fermentation container 12 together with the fluid supplied from the fluid supply module 5 and mixed with the portion of the ingredients accommodated in the fermentation container 12.

A main ingredient which is essential for making a beverage may be accommodated in the fermentation container 12, and additives added to the main ingredient may be accommodated in the ingredient supplier 3. In this case, the additives accommodated in the ingredient supplier 3 may be mixed with the fluid supplied from the fluid supply module 5 and supplied to the fermentation container 12 and then may be mixed with the main ingredient accommodated in the fermentation container 12.

The main ingredient accommodated in the fermentation container 12 may have a capacity or amount greater than a capacity or amount of other ingredients. For example, when beer is made, the main material may be malt of the malt, the fermentation facilitator, the hop, and the flavoring additive. Also, the additives accommodated in the ingredient supplier 3 may be the other ingredient except for the malt of the ingredients for making the beer, for example, the fermentation facilitator, the hop, and the flavoring additive.

The beverage maker may not include the ingredient supplier 3 but may include only the fermentation container 12. In this case, the main ingredient may be accommodated in the fermentation container 12, and a user may directly put the additives into the fermentation container 12.

If the beverage maker includes both the ingredient supplier 3 and the fermentation container 12, the beverage may be more easily made. Hereinafter, a case in which the beverage maker includes both the ingredient supplier 3 and the fermentation container, will be described as an example. However, embodiments are not limited to the case in which the beverage maker includes both the ingredient supplier 3 and the fermentation container 12.

The ingredients within the fermentation container 12 may be fermented as time elapses, and the beverage made in the fermentation container 12 may flow to the second main channel 42 through the main channel connection portion 115 and also flow from the second main channel 42 to the beverage dispenser 6 so as to be dispensed. The ingredients necessary for making the beverage may be accommodated in the ingredient supplier 3, and the fluid supplied from the fluid supply module 5 may pass through ingredient supplier 3. For example, when the beverage made in the beverage maker is beer, the ingredients accommodated in the ingredient supplier 3 may be the fermentation facilitator, the hop, and the flavoring additive, for example.

The ingredients accommodated in the ingredient supplier 3 may be directly accommodated in the ingredient accommodation portions 31, 32, and 33 provided in the ingredient supplier 3. At least one ingredient accommodation portion 31, 32, and 33 may be provided in the ingredient supplier 3. Further, a plurality of ingredient accommodation portions 31, 32, and 33 may be provided in the ingredient supplier 3. In this case, the ingredient accommodation portions 31, 32, and 33 may be partitioned with respect to each other.

Inlets 31*a*, 32*a*, and 33*a* through which fluid may be introduced and outlets 31*b*, 32*b*, and 33*b* through which the fluid may be discharged may be provided in the ingredient accommodation portions 31, 32, and 33, respectively. The fluid introduced into the inlet of one ingredient accommodation portion may be mixed with ingredients within the ingredient accommodation portion and then discharged through the outlet.

The ingredients accommodated in the ingredient supplier 3 may be accommodated in ingredient containers C1, C2, and C3. In this case, the ingredient containers C1, C2, and C3 may be accommodated in the ingredient accommodation portions 31, 32, and 33, and each of the ingredient accommodation portions 31, 32, and 33 may be referred to as an "ingredient container mounting portion".

The ingredient containers C1, C2, and C3 may each include a capsule or a pod; however, embodiments are not limited thereto. When the ingredients are accommodated in the ingredient containers C1, C2, and C3, the ingredient supplier 3 may be configured so that the ingredient containers C1, C2, and C3 are seated therein and withdrawn therefrom. The ingredient supplier 3 may be provided as an ingredient containers kit assembly in which the ingredient containers C1, C2, and C3 are separably accommodated.

For example, a first additive, a second additive, and a third additive may be accommodated in the ingredient supplier 3. The first additive may be the fermentation facilitator, the second additive may be the hop, and the third additive may be the flavoring additive. The ingredient supplier 3 may include a first ingredient container mounting portion 31 in which a first ingredient container C1 containing the first additive is accommodated, a second ingredient container mounting portion 32 in which a second ingredient container C2 containing the second additive is accommodated, and a third ingredient container mounting portion 33 in which a third ingredient container C3 containing the third additive is accommodated.

The ingredients contained in the ingredient accommodation portion or the ingredient containers C1, C2, and C3 may be extracted by a fluid pressure of the fluid supplied from the fluid supply module 5. When the ingredients are extracted by the fluid pressure, the fluid supplied from the fluid supply module 5 to the first main channel 41 may pass through the ingredient accommodation portion or the ingredient containers C1, C2, and C3 and then be mixed with the ingredients, and the ingredients accommodated in the ingredient accommodation portion or the ingredient containers C1, C2, and C3 may flow to the second main channel together with the fluid.

A plurality of additives different from each other may be accommodated separately in the ingredient supplier 3. For example, when beer is made, the plurality of additives accommodated in the ingredient supplier 3 may be the fermentation facilitator, the hop, and the flavoring additive, which may be accommodated separately from each other.

When the plurality of ingredient accommodation portions is provided in the ingredient supplier 3, the plurality of ingredient accommodation portions 31, 32, and 33 may be connected in series to each other in a flow direction of the fluid. That is, the ingredient supplier 3 may include at least one connecting channel 311 and 312 that connects the outlet of one ingredient accommodation portion of the plurality of ingredient accommodation portions 31, 32, and 33 to the inlet of another ingredient accommodation portion.

Further, the plurality of ingredient accommodation portions 31, 32, and 33 may include an initial ingredient accommodation portion 31 and a final ingredient accommodation portion 33. The plurality of ingredient accommodation portions 31, 32, and 333 may further include an intermediate ingredient accommodation portion 32.

The inlet 31*a* of the initial ingredient accommodation portion 31 may be connected to the first main channel 41, and the outlet 33*b* of the final ingredient accommodation portion 33 may be connected to the second main channel 42. The intermediate ingredient accommodation portion 32 may be disposed between the first ingredient accommodation portion 31 and the second ingredient accommodation portion 33 in the flow direction of the fluid. The inlet 32*a* and the outlet 32*b* of the intermediate ingredient accommodation portion 32 may be connected to the connecting channels 311 and 312 different from each other.

As illustrated in FIG. 1, when three ingredient accommodation portions are provided in the ingredient supplier 3, the outlet 31*b* of the final ingredient accommodation portion 31 may be connected to the inlet 32*a* of the intermediate ingredient accommodation portion 32 through the first connecting channel 311, and the outlet 32*b* of the intermediate ingredient accommodation portion 32 may be connected to the inlet 33*a* of the final ingredient accommodation portion 33 through the second connecting channel 312. In this case, the fluid introduced into the inlet 31*a* of the final ingredient accommodation portion 31 through the first main channel 41 may flow to the first connecting channel 311 through the outlet 31*b* together with the first additive accommodated in the initial ingredient accommodation portion 31.

The fluid (a mixture of the fluid and the first additive) introduced into the inlet 32*a* of the intermediate ingredient accommodation portion 32 through the first main channel 311 may flow to the second connecting channel 312 through the outlet 32*b* together with the second additive accommodated in the intermediate ingredient accommodation portion 32. The fluid (the mixture of the fluid and the first and second additives) introduced into the inlet 33*a* of the final ingredient accommodation portion 33 through the second main channel 312 may flow to the second connecting channel 42 through the outlet 33*b* together with the third additive accommodated in the final ingredient accommodation portion 33. The fluid (the mixture of the fluid and the first, second, and third additives) discharged through the second main channel 42 may be guided to the main channel connection portion 115 of the fermentation module 1 and then introduced into the fermentation container 12.

However, the configuration of the ingredient supplier 3 is not limited thereto. For example, when the intermediate ingredient accommodation portion is not provided, two ingredient accommodation portions may be provided in the ingredient supplier 3. In this case, one ingredient accommodation portion may be the initial ingredient accommodation portion, and the other ingredient accommodation portion may be the final ingredient accommodation portion. The outlet of the initial ingredient accommodation portion and the inlet of the final ingredient accommodation portion may be connected to each other by the connecting channel.

For another example, when a plurality of intermediate ingredient accommodation portions is provided, four or more ingredient accommodation portions may be provided in the ingredient supplier 3. In this case, one ingredient accommodation portion may be the initial ingredient accommodation portion, another ingredient accommodation portion may be the final ingredient accommodation portion, and the remaining ingredient accommodation portions may be intermediate ingredient accommodation portions. In this case, as the connection between the ingredient accommodation portions in series is easily understood by a person skilled in the art, their detailed descriptions has been omitted.

As the plurality of ingredient accommodation portions 31, 32, and 33 is connected in series to each other, a channel configuration of the ingredient supplier 3 may be simplified. Also, as additives contained in the ingredient containers C1, C2, and C3 are extracted at once, a time taken to extract the additives may decrease. Also, the ingredient supplier 3 may minimize fluid leakage points to improve reliability.

When the ingredients accommodated in the ingredient supplier 3 are accommodated in the ingredient containers C1, C2, and C3, the initial ingredient accommodation portion 31 may be referred to as an "initial ingredient container mounting portion", the intermediate ingredient accommodation portion 32 may be referred to as an "intermediate ingredient container mounting portion", and the final ingredient accommodation portion 33 may be referred to as a "final ingredient container mounting portion".

Hereinafter, the fluid supply module 5 will be described.

The fluid supply module 5 may include a tank 51, a pump 52 to pump a fluid, such as water within the tank 51, and a heater 53 that heats the fluid pumped by the pump 52. The tank 51 and the pump 52 may be connected to a tank discharge channel 55a, and the fluid contained in the tank 51 may be introduced into the pump 52 through the tank discharge channel 55a. The pump 52 and one or a first end of the first main channel 41 may be connected to a fluid supply channel 55b, and the fluid discharged from the pump 52 may be guided to the first main channel 41 through the fluid supply channel 55b.

A muffler 56a that reduces noise and a flow meter 56b that measures a flow rate of the fluid discharged from the tank 51 may be installed in the tank discharge channel 55a. The muffler 56a may be disposed in front of the flow meter 56b with respect to the flow direction of the fluid.

A flow rate control valve 54 that controls a flow rate of the fluid discharged from the tank 51 may be installed in the tank discharge channel 55a. The flow rate control valve 54 may include a step motor.

A thermistor 54a that measures a temperature of the fluid discharged from the tank 51 may be installed in the tank discharge channel 55a. The thermistor 54a may be built in the flow rate control valve 54.

A fluid supply check valve 59 that prevents the fluid from flowing back to the pump 52 may be installed in the fluid supply channel 55b.

The heater 53 may be installed in the fluid supply channel 55b. The heater 53 may be include a thermostat 58 that constantly adjusts a temperature of the heater 53.

The fluid supply module 5 may further include a safety valve 53a. The safety valve 53a may communicate with an inside of the heater 53. The safety valve 53a may restrict a maximum inner pressure of the heater 53. For example, the safety valve 53a may restrict the maximum inner pressure of the heater 53 to a pressure of about 3.0 bar.

The fluid supply module 5 may further include a fluid supply temperature sensor 57 that measures a temperature of the fluid passing through the heater 53. The fluid supply temperature sensor 57 may be connected to the heater 53.

When the pump 52 is driven, the fluid within the tank 51 may be introduced into the pump 52 through the tank discharge channel 55a, and the fluid discharged from the pump 52 may be heated in the heater 53 while flowing through the water supply channel 55b and then be guided to the first main channel 41.

Hereinafter, the beverage dispenser 6 will be described.

The beverage dispenser 6 may be connected to the second main channel 42. That is, the beverage dispenser 6 may include dispenser 62 that dispenses the beverage and a beverage dispensing channel 61 that connects the dispenser 62 to the second main channel 42.

The beverage dispensing channel 61 may connect the second main channel 42 to the dispenser 62. The beverage dispensing channel 61 may have one or a first end 61a connected between the main check valve 314 and the main valve 40 with respect to the second main channel 42 and the other or a second end connected to the dispenser 62.

A beverage dispensing valve 64 that opens and closes the beverage dispensing channel 61 may be installed in the beverage dispensing channel 61. The beverage dispensing valve 64 may be opened when the beverage is dispensed to open the beverage dispensing channel 61. The beverage dispensing valve 64 may be opened when residual fluid is removed to open the beverage dispensing channel 61. The beverage dispensing valve 64 may be opened when the beverage dispenser is cleaned to open the beverage dispensing channel 61.

A decompression component 60 that prevents a pressure of the beverage passing through the beverage dispensing channel 61 from rapidly increasing may be installed in the beverage dispensing channel 61. The decompression component 60 may be installed behind the beverage dispensing valve 64 with respect to the dispensing direction of the beverage. The decompression component 60 may be disposed adjacent to the beverage dispensing valve 64.

The pressure of the beverage passing through the decompression component 60 may gradually decrease. The beverage passing through the decompression component 60 may be dispensed from the dispenser 62 and may not generate excessive bubbles.

When the beverage is dispensed, the beverage dispensing valve 64 may be opened. When the beverage is not dispensed, the beverage dispensing valve 64 may remain closed.

The dispenser 62 may include lever 620. When the user manipulates the lever 620, the beverage dispensing valve 64 may be opened, and when the lever 620 returns to its original position, the beverage dispensing valve 64 may be closed.

Hereinafter, the gas discharger 7 will be described.

The gas discharger 7 may be connected to the fermentation module 1 to discharge a gas generated in the fermentation container 12. The gas discharger 7 may include a gas discharge channel 71 connected to the fermentation module 1, a gas pressure sensor 72 installed in the gas discharge channel 71, and a gas discharge valve 73 connected to the gas discharge channel 71. The gas discharge valve 73 may be disposed behind or downstream of the gas pressure sensor 72 in a gas discharge direction.

The gas discharge channel 71 may be connected to the fermentation module 1, particularly, the fermentation lid 107. A gas discharge channel connection portion 121 to which the gas discharge channel 71 may be connected may be provided in the fermentation lid 107.

The gas within the fermentation container 12 may flow into the gas discharge channel 71 through the gas discharge channel connection portion 121. The gas pressure sensor 72 may detect a pressure of the gas discharged to the gas discharge channel 71 through the gas discharge channel connection portion 121 within the fermentation container 12.

The gas discharge valve 73 may be turned on to be opened when air is injected into the fermentation container 12 by the air injector 8. The beverage maker may uniformly mix the malt with the fluid by injecting the air into the fermentation container 12. Foam generated in the liquid malt may be discharged from an upper portion of the fermentation container 12 to the outside through the gas discharge channel 71 and the gas discharge valve 73. The gas discharge valve 73 may be opened or closed at least one time to detect fermentation during a fermentation process or operation.

The gas discharger 7 may further include a safety valve 75 connected to the gas discharge channel 71. The safety valve 75 may be disposed behind or downstream of the gas pressure sensor 72 with respect to the gas flow direction.

The safety valve 75 may restrict a maximum pressure of the fermentation container 12 and the gas discharge channel 71. For example, the safety valve 75 may restrict the maximum pressure of the fermentation container 12 and the gas discharge channel 71 to a pressure of about 3.0 bar.

Figure 2:
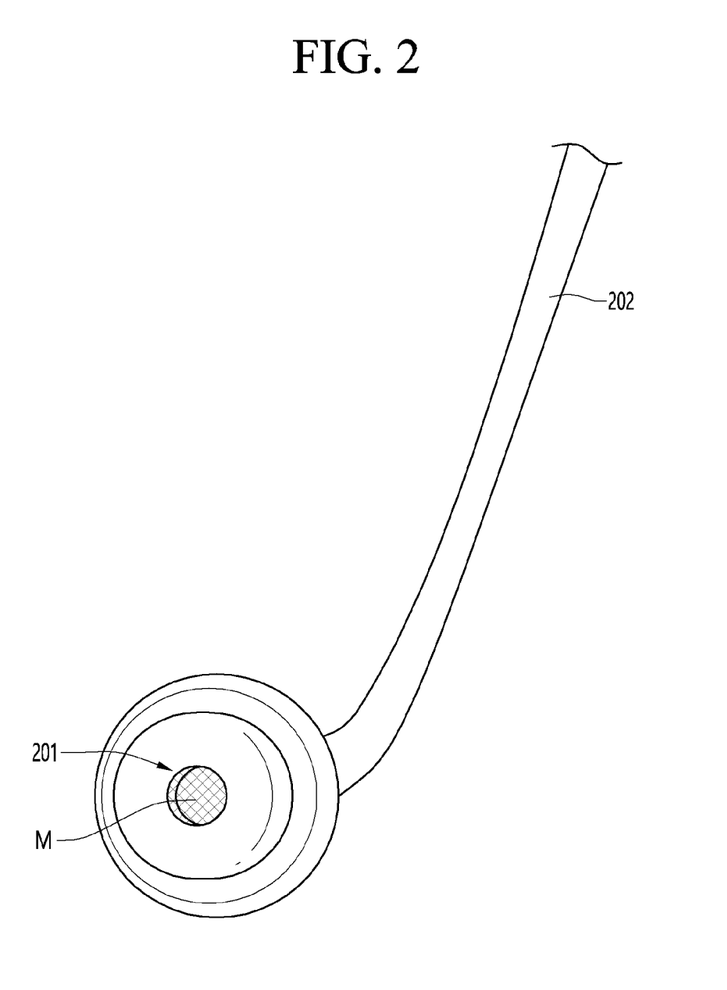
FIG. 2 is a view illustrating a gas discharge end fitting according to an embodiment.

The gas discharger 7 may further include a gas discharge end fitting 201 and a first fitting connection channel 202. In the gas discharge end fitting 201, a gas passing through the gas discharge valve 73 may be discharged. The first fitting connection channel 202 may connect the gas discharge valve 73 to the gas discharge end fitting 201. The gas passing through the gas discharge valve 73 may be guided to the gas discharge end fitting 201 by the first fitting connection channel 202 and be discharged from the gas discharge end fitting 201.

The gas discharge end fitting 201 may be a member having a passage communicating with the first fitting connection channel 202 therein. A mesh M may be provided on the gas exhaust end fitting 201. The mesh M may be disposed in a passage provided in the gas exhaust end fitting 201.

A gas passing through the gas discharge valve 73 may be smoothly discharged from the gas discharge end fitting 201 by passing through the mesh M. The mesh M provided in the gas discharge end fitting 201 may prevent insects or foreign substances from being introduced into the gas exhaust end fitting 201. In the gas discharge end fitting 201, the fermentation gas generated in the fermentation container 12 may be discharged during the fermentation operation. As the fermentation gas contains sugar, insects may gather. The gas discharge end fitting 201 provided with the mesh M may solve this limitation.

The gas discharger 7 may further include a pressure release valve 76. The pressure release valve 76 may be connected to the gas discharge channel 71. The pressure release valve 76 and the gas discharge valve 73 may be selectively opened/closed. The pressure release valve 76 may be disposed behind or downstream of the gas pressure sensor 72 with respect to the gas flow direction.

A noise reducing device 77 may be mounted on the pressure release valve 76. The noise reducing device 77 may include at least one of an orifice structure or a muffler structure.

Even though the pressure release valve 76 is opened, an inner pressure of the fermentation container 12 may be gradually decreased by the noise reducing device 77. When fermentation of the beverage progresses, the pressure release valve 76 may be opened to release the pressure in a state in which the inner pressure of the fermentation container 12 increases. The noise reducing device 77 may effectively reduce noise generated due to a difference in pressure between the inside and outside of the fermentation container 12. The pressure release valve 76 may be opened/closed in the fermentation process or operation in which the inner pressure is relatively high.

The gas discharger 7 may further include a pressure release end fitting 203 and a second fitting connection channel 204. The pressure release end fitting 203 and the second fitting connection channel 204 may be the same as or similar to the gas discharge end fitting 201 and the first fitting connection channel 202 shown in FIG. 2. In the pressure release end fitting 203, a gas passing through the pressure release valve 76 may be discharged. The second fitting connection channel 204 may connect the pressure release valve 76 to the pressure release end fitting 203. The gas passing through the pressure release valve 76 may be guided to the pressure release end fitting 203 by the second fitting connection channel 204 and be discharged from the pressure release end fitting 203.

A noise reduction device 77 may be provided in the second fitting connection channel 204. That is, a passage in the noise reduction device 77 may be provided in the second fitting connection channel 204.

The pressure release end fitting 203 may be a member having a passage communicating with the second fitting connection channel 204 therein. The pressure release end fitting 203 may be provided with a mesh M like the gas discharge end fitting 201. The mesh M may be disposed in a passage provided in the pressure release end fitting 203.

A gas passing through the pressure release valve 76 may be smoothly discharged from the pressure release end fitting 203 through the mesh M. The mesh M provided in the pressure release end fitting 203 may prevent insects or foreign substances from being introduced into the pressure release end fitting 203.

In the pressure release end fitting 203, like the gas discharge end fitting 201, the fermentation gas generated in the fermentation container 12 may be discharged during the fermentation process. As the fermentation gas contains sugar, insects may gather. The pressure release end fitting 203 provided with the mesh M may solve this concern.

Hereinafter, the air injector 8 will be described.

The air injector 8 may be connected to the fluid supply module 5 or the first main channel 41 to inject air. The air injector 8 may be connected to an opposite side of a sub channel 91, which will be described hereinafter, with respect to the heater 53.

In this case, air injected by the air injector 8 may pass through the heater 53 to flow to the sub channel 91 together with residual fluid within the heater 53. Thus, the residual fluid within the heater 53 may be removed to maintain a clean state of the heater 53.

Alternatively, air injected by the air injector 8 to the first main channel 41 may successively pass through the bypass channel 43 and the second main channel 42 and then be injected into the fermentation container 12. Thus, stirring or aeration may be performed in the fermentation container 12.

Alternatively, the air injected from the air injector 8 to the first main channel 41 may be guided to the ingredient supplier 3 to flow to the ingredient container mounting portions 31, 32, and 33. Residual fluid or residue within the ingredient containers C1, C2, and C3 or the ingredient container mounting portions 31, 32, and 33 may flow to the second main channel 42 by the air injected by the air injector 8 and then be discharged to the beverage dispenser 6. The ingredient containers C1, C2, and C3 and the ingredient container mounting portions 31, 32, and 33 may be cleanly maintained by the air injected by the air injector 8.

The air injector 8 may include an air injection channel connected to the fluid supply channel 55b or the first main channel 41 and air injection pump 82 connected to the air injection channel 81. An air injection check valve 83 that prevents the fluid within the fluid supply channel 55*b* from being introduced into the air injection pump 82 through the air injection channel 81 may be installed in the air injection channel 81.

The air injection pump 82 may pump the air to the air injection channel 81. A discharge portion of the air injection pump 82 may be connected to the air injection channel 81.

Air passing through an air filter 150 may be suctioned into a suction portion of the air injection pump 82. That is, the beverage maker may include air filter 150 and an air suction channel 152 connected to the air filter 150. A muffler 150*a* that reduces noise generated when the air is suctioned may be installed in the air suction channel 152.

The air suction channel 152 may be branched into a first suction channel 84 and a second suction channel 153. The first suction channel 84 may be connected to a suction portion of the air injection pump 82, and the second suction channel 153 may be connected to a suction portion of an air supply pump 151 described hereinafter. However, embodiments are not limited thereto, and thus, air passing through different filters may be suctioned into the suction portion of the air injection pump 82 and the suction portion of the air supply pump 151.

Hereinafter, the air controller 15 will be described.

The air controller 15 may control a pressure between the inner wall of the fermenter 112 and the outer surface of the fermentation container 12. The air controller 15 may supply air into the space between the fermentation container 12 and the fermenter 112. On the other hand, the air controller 15 may exhaust the air within the space between the fermentation container 12 and the fermenter 112 to the outside.

The air conditioner 15 may include air supply pump 151, an air supply channel 154 that connects the air supply pump 151 to the fermentation module 1, an exhaust channel 157 connected to the air supply channel 154 to exhaust air to the outside, and an exhaust valve 156 connected to the exhaust channel 157. The air supply pump 151 may inject air into the air supply channel 154. A discharge portion of the air supply pump 151 may be connected to the air supply channel 154, and a suction portion may be connected to the second suction channel 153 described above.

The air supply channel 154 may be connected to the fermentation module 1, particularly, the fermentation lid 107. An air supply channel connection portion 117 to which the air supply channel 154 may be connected may be provided in the fermentation module 1. The air supply channel connection portion 117 may communicate with the space between the inner wall of the fermenter 112 and the outer surface of the fermentation container 12.

The air injected from the air supply pump 151 to the air supply channel 154 may be guided between the outer surface of the fermentation container 12 and the inner wall of the fermenter 112. The air supplied into the fermenter 112 may press the fermentation container 12 between the outer surface of the fermentation container 12 and the inner wall of the fermenter 112.

The beverage within the fermentation container 12 may be pressed by the fermentation container 12 which is contracted by the air. When the main valve 40 and the beverage dispensing valve 64 are opened, the beverage may pass through the main channel connection portion 115 to flow to the second main channel 42. The beverage flowing from the fermentation container 12 to the second main channel 42 may be dispensed to the outside through the beverage dispenser 6.

The air supply pump 151 may supply air so that a predetermined pressure occurs between the fermentation container 12 and the fermenter 112. Thus, a pressure at which the beverage within the fermentation container 12 is easily dispensed may be occur between the fermentation container 12 and the fermenter 112.

The air supply pump 151 may be maintained in a turned-off state while the beverage is dispensed. When the beverage is completely dispensed, the air pump 82 may be driven for next beverage dispensing and then stopped. Thus, the beverage maker may dispense the beverage to the beverage dispenser 6 in a state in which the fermentation container 12 is disposed within the fermentation module 1 without withdrawing the fermentation container 12 to the outside of the fermentation module 1.

The exhaust channel 157 may function as an air exhaust passage, through which the air between the fermentation container 12 and the fermenter 112 may be exhausted to the outside, together with a portion of the air supply channel 154. The exhaust channel 157 may be disposed outside of the fermentation module 1. The exhaust channel 157 may be connected to a portion of the air supply channel 154, which is disposed outside of the fermenter 112.

The air supply channel 154 may include a first channel connected between the air supply pump 151 to a connection portion 157*a*, to which the exhaust channel 157 may be connected, and a second channel between a connection portion 154*a*, to which the exhaust channel 157 may be connected, and the air supply channel connection portion 117. The first channel may be an air supply channel that guides the air pumped by the air supply pump 151 to the second channel. Also, the second channel may be an air supply and exhaust-combined channel that supplies the air passing through the air supply channel into the space between the fermenter 112 and the fermentation container 12 or guides the air discharged from the space between the fermenter 112 and the fermentation container 12 to the exhaust channel 157.

The exhaust channel 157 may exhaust air therethrough. The exhaust valve 156 may be opened so that the air between the fermentation container 12 and the fermenter 112 may be exhausted to the outside when the fermentation container 12 is expanded while the beverage is made. The exhaust valve 156 may be opened when fluid is supplied by the fluid supply module 5. The exhaust valve 156 may be opened when air is injected by the air injector 8.

The exhaust valve 156 may be opened so that the air between the fermentation container 12 and the fermenter 112 may be exhausted when the beverage within the fermentation container 12 is completely dispensed. The user may take the fermentation container 12 out of the fermenter 112 when the beverage is completely dispensed. This is done because safety accidents occur when the inside of the fermenter 112 is maintained at a high pressure. The exhaust valve 156 may be opened when the beverage within the fermentation container 12 is completely dispensed.

The air controller 15 may further include an air restriction valve 159 that restricts the air pumped by the air supply pump 151 and supplied between the fermentation container 12 and the fermenter 112. The air restriction valve 159 may be a check valve.

The air restriction valve 159 may be installed in the air supply channel 154. That is, the air restriction valve 159 may be installed between the air supply pump 151 of the air supply channel 154 and the connection portion 157*a* of the exhaust channel 157.

The air controller 15 may further include an exhaust end fitting 205 and a third fitting connection channel 206. The exhaust end fitting 205 and the third fitting connection channel 206 may be the same as or similar to the gas discharge end fitting 201 and the first fitting connection channel 202 shown in FIG. 2. In the exhaust end fitting 205, air passing through the exhaust valve 156 may be exhausted. That is, the third fitting connection channel 206 may connect the exhaust valve 156 to the exhaust end fitting 205. The air passing through the exhaust valve 156 may be guided to the exhaust end fitting 205 by the third fitting connection channel 206 and may be exhausted from the exhaust end fitting 205.

The exhaust end fitting 205 may be a member having a passage communicating with the third fitting connection channel 206 therein. The exhaust end fitting 205 may be provided with a mesh M, like the gas exhaust end fitting 201. The mesh M may be disposed in a passage provided in the exhaust end fitting 205.

The gas passing through the exhaust valve 156 may be smoothly discharged from the exhaust end fitting 205 through the mesh M. The mesh M provided in the exhaust end fitting 205 may prevent insects or foreign substances from being introduced into the exhaust end fitting 205.

In the exhaust end fitting 205, air between the inner wall of the fermentation tank 112 and the outer surface of the fermentation container 12 may be exhausted. If the fermentation container 12 is not completely sealed, the fermentation gas within the fermentation container 12 may leak between the fermenter 112 and the fermentation container 12 and then be mixed with the air that is exhausted through the exhaust end fitting 205. Thus, as the air exhausted through the exhaust end fitting 205 contains sugar of the fermentation gas, insects may gather. The exhaust end fitting 205 provided with the mesh M may solve this concern.

Hereinafter, the sub channel 91 will be described.

The sub channel 91 may connect the fluid supply module 5 to the beverage dispenser 6. The sub channel 91 may have one or a first end 91a connected to the fluid supply channel 55b and the other or a second end 91b connected to the beverage dispensing channel 61.

The sub channel 91 may be connected between the pump 52 and the heater 53 with respect to the fluid supply channel 55b. The sub channel 91 may be connected to the connection portion 61a of the second main channel 42 and the beverage dispensing valve 64 with respect to the beverage dispensing channel 61.

The fluid supplied by the pump 52 and the air pumped by the air injection pump 82 may be guided to the beverage dispensing channel 61 through the sub channel 91 and then dispensed to the dispenser 62. Thus, residual fluid or beverage remaining in the beverage dispenser 6 may be removed.

A sub valve 92 that opens and closes the sub channel 91 may be installed in the sub channel 91. The sub valve 92 may be opened to open the sub channel 91 when the beverage is dispensed, or cleaning is performed.

A sub check valve 93 that prevents the beverage of the beverage dispensing channel 61 from flowing back to the fluid supply module 5 may be installed in the sub channel 91. The sub check valve 93 may be disposed between the sub valve 92 and the beverage dispensing channel 61 with respect to the sub channel 91.

The sub channel 91 may function as a residual fluid removing channel of the fluid supply module 5. For example, when the air injection pump 82 is turned on in a state in which the bypass valve 35 and the ingredient supply valve 310 are closed, the sub valve 92 is opened, the air injected into the air injection channel 81 may pass through the heater 53 to flow to the sub channel 91. Then, the air may pass through the sub valve 92 to flow to the beverage dispensing channel 61 and then be dispensed to the dispenser 62. In this process, the air may be dispensed together with the fluid supply module 5, more particularly, residual fluid remaining in the heater 53 and the fluid supply channel 55b so that residual fluid may be removed.

The sub channel 91 may also function as a cleaning channel. When a portion of the beverage is dispensed from the dispenser 62, and a long time has elapsed until the next dispensing, the dispenser 62 may be cleaned by allowing fluid to flow into the sub channel 91 before performing the next dispensing.

Hereinafter, the air removal module 50 will be described.

The pump 52 may include a gear pump. As the gear pump is used, a lubricant (grease) applied to a surface of an inner rotor and an inner wall of the pump may be gradually exhausted. Then, when used over a certain number of times, a pressure difference between an inlet and an outlet of the pump 52, which is generated by the gear pump, may gradually decrease. The inlet of the pump 52 may be connected to the tank discharge channel 55a, and the outlet may be connected to the fluid supply channel 55b.

The air removal module 50 may temporarily remove flow path resistance acting on the pump 52. That is, the air in the pump 52 may be removed by the air removal module 50, and instead, the fluid in the tank 51 may be introduced into the pump 52 by a head pressure. Thus, the pump 52 may smoothly supply fluid through the fluid supply channel 55b.

The air removal module 50 may include an air removal channel 50a and an air removal valve 50b connected to the air removal channel 50a. The air removal channel 50a may be connected to the fluid supply channel 55b. That is, the air removal channel 50a may be branched from the fluid supply channel 55b.

The air removal channel 50a may be connected to a point on the fluid supply channel 55b, which is adjacent to the pump 52. For example, the air removal channel 50a may be connected between the pump 52 and the heater 53 in the fluid supply channel 55b. In this case, the connection portion between the air removal channel 50a and the fluid supply channel 55b may be closer to the pump 52 than the heater 52.

The air removal valve 50b may include a solenoid valve. When the air removal valve 50b is opened, the air removal channel 50a may be opened, and air in the air removal channel 50a may be discharged to the outside through the air removal valve 50b. As a result, the air in the pump 52 may flow into the air removal channel 50a, and the fluid in the tank 51 may be introduced into the pump 52 by the head pressure.

The beverage maker may maintain the air removal valve 50b in a closed state when the pump 52 operates so that the fluid does not flow through the fluid supply channel 55b. In a state in which operation of the pump 52 is stopped, the air removal valve 50b may be opened. The beverage maker may allow the pump 52 to operate after the air removal valve 50b is opened for a predetermined period of time, and the air removal valve 50a is closed when the tank 51 is empty to refill the tank 51.

According to embodiments disclosed herein, the mesh may be provided on the gas discharge end fitting through which the gas passing through the gas discharge valve is discharged. Thus, insects gathered by the fermentation gas containing the sugar may be prevented from being introduced into the fermenter, more particularly, the fermentation container through the gas exhaust end fitting.

The mesh may be provided on the pressure release end fitting through which the gas passing through the pressure release valve is discharged. Thus, insects gathered in the fermentation gas containing the sugar may be prevented from being introduced into the fermenter, more specifically, the fermentation container through the pressure release end fitting.

The mesh may be provided on the exhaust end fitting through which the air passing through the exhaust valve is discharged. Thus, insects gathered in the air containing the sugar of the fermentation gas may be prevented from being introduced between the inner wall of the fermenter, more specifically, the fermenter and the outer surface of the fermenter through the exhaust end fitting.

As insects and foreign substances are prevented from being introduced into the fermenter and the fermentation container, a quality of the beverage may be prevented from being deteriorated, and the beverage maker may be maintained in a clean state.

Embodiments disclosed herein provide a beverage maker that prevents insects, for example, worms from being introduced into a fermenter.

In a beverage maker according to embodiments disclosed herein, a fermentation gas within a fermenter may be discharged through a gas discharge end fitting provided with a mesh. Thus, the mesh may prevent insects gathered by the fermentation gas containing sugar from being introduced into the fermenter through the gas exhaust end fitting.

In addition, air between the fermenter and the fermentation container may be exhausted through an exhaust end fitting provided with a mesh. Thus, the mesh may prevent insects gathered in air mixed with the fermentation gas containing sugars from being introduced into the fermenter through exhaust end fitting.

A beverage maker according to embodiments disclosed herein may include a fermenter having an opening; a fermentation lid configured to cover the opening at an upper side; a gas discharge channel configured to communicate with an inside of the fermenter; a gas discharge valve connected to the gas discharge channel; and a gas discharge end fitting through which a gas passing through the gas discharge valve passes and which is provided with a mesh. The beverage maker may further include a fitting connection channel configured to connect the gas discharge valve to the gas discharge end fitting.

The beverage maker may further include a pressure release valve connected to the gas discharge channel, the pressure release valve being selectively opened and closed with respect to the gas discharge valve; and a pressure release end fitting through which a gas passing through the pressure release valve passes and which is provided with a mesh. The beverage maker may further include a fitting connection channel configured to connect the pressure release valve to the pressure release end fitting. A noise reduction device including at least one of an orifice or a muffler may be provided in the fitting connection channel.

A gas discharge channel connection portion to which the gas discharge channel may be connected may be provided in the fermentation lid. A fermentation container having a flexible material may be accommodated in the fermenter through the opening, and the gas discharge channel may communicate with an inside of the fermentation container.

The beverage maker may further include an air supply channel configured to guide air pumped by an air supply pump to a space between an inner wall of the fermenter and an outer surface of the fermentation container; an exhaust channel connected to the air supply channel to exhaust the air between the inner wall of the fermenter and the outer surface of the fermentation container; an exhaust valve connected to the exhaust channel; and an exhaust end fitting through which the air passing through the exhaust valve is exhausted and which is provided with a mesh. The beverage maker may further include a fitting connection channel configured to connect the exhaust valve to the exhaust end fitting. An air supply channel connection portion to which the air supply channel is connected may be disposed on the fermentation lid.

A beverage maker according to another embodiment may include a fermenter having an opening; a fermentation lid configured to cover the opening at an upper side; a fermentation container inserted into the fermenter through the opening, the fermentation container having a flexible material; an exhaust channel configured to exhaust air between an inner wall of the fermenter and an outer surface of the fermentation container; an exhaust valve connected to the exhaust channel; and an exhaust end fitting through which the air passing through the exhaust valve passes and which is provided with a mesh. The beverage maker may further include a fitting connection channel configured to connect the exhaust valve to the exhaust end fitting. An air supply channel connection portion to which the air supply channel may be connected may be provided in the fermentation lid.

The beverage maker may further include a gas discharge channel configured to communicate with an inside of the fermentation container; a gas discharge valve connected to the gas discharge channel; and a gas discharge end fitting through which a gas passing through the gas discharge valve passes and which is provided with a mesh. The beverage maker may further include a fitting connection channel configured to connect the gas discharge valve to the gas discharge end fitting.

The beverage maker may further include a pressure release valve connected to the gas discharge channel, the pressure release valve being selectively opened and closed with respect to the gas discharge valve; and a pressure release end fitting through which a gas passing through the pressure release valve passes and which is provided with a mesh.

The beverage maker may further include a fitting connection channel configured to connect the pressure release valve to the pressure release end fitting. A noise reduction device including at least one of an orifice or a muffler may be provided on the fitting connection channel. A gas discharge channel connection portion to which the gas discharge channel may be connected may be provided in the fermentation lid.

The details of one or more embodiments are set forth in the accompanying drawings and the description. Other features will be apparent from the description and drawings, and from the claims.

The disclosed subject matter is to be considered illustrative, and not restrictive, and the appended claims are intended to cover all such modifications, enhancements, and other embodiments, which fall within the true spirit and scope. Thus, embodiments are to be considered illustrative, and not restrictive, and the technical spirit of the present disclosure is not limited to the disclosed embodiments. Therefore, the scope is defined not by the detailed description but by the appended claims, and all differences within the scope will be construed as being included.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A beverage maker, comprising:
   a fermenter having an opening;
   a fermentation lid configured to cover the opening of the fermenter;
   a gas discharge channel configured to communicate with an inside of the fermenter;
   a gas discharge valve connected to the gas discharge channel;
   a gas discharge end fitting through which a gas passing through the gas discharge valve passes and which is provided with a mesh;
   a first fitting connection channel configured to connect the gas discharge valve to the gas discharge end fitting;
   a pressure release valve connected to the gas discharge channel, the pressure release valve being selectively opened and closed with respect to the gas discharge valve;
   a pressure release end fitting through which a gas passing through the pressure release valve passes and which is provided with a second mesh; and
   a second fitting connection channel configured to connect the pressure release valve to the pressure release end fitting, wherein a noise reduction device comprising at least one of an orifice or a muffler is provided in the second fitting connection channel.

2. The beverage maker according to claim 1, wherein a gas discharge channel connection portion to which the gas discharge channel is connected is provided in the fermentation lid.

3. The beverage maker according to claim 1, wherein a fermentation container including a flexible material is accommodated in the fermenter through the opening, and wherein the gas discharge channel communicates with an inside of the fermentation container.

4. The beverage maker according to claim 3, further comprising:
   an air supply channel configured to guide air pumped by an air supply pump to a space between an inner wall of the fermenter and an outer surface of the fermentation container;
   an exhaust channel connected to the air supply channel to exhaust the air between the inner wall of the fermenter and the outer surface of the fermentation container;
   an exhaust valve connected to the exhaust channel; and
   an exhaust end fitting through which the air passing through the exhaust valve is exhausted and which is provided with a third mesh.

5. The beverage maker according to claim 4, further comprising a third fitting connection channel configured to connect the exhaust valve to the exhaust end fitting.

6. The beverage maker according to claim 4, wherein an air supply channel connection portion to which the air supply channel is connected is disposed on the fermentation lid.

7. A beverage maker, comprising:
   a fermenter having an opening;
   a fermentation lid configured to cover the opening of the fermenter;
   a fermentation container inserted into the fermenter through the opening, the fermentation container including a flexible material;
   an exhaust channel configured to exhaust air between an inner wall of the fermenter and an outer surface of the fermentation container;
   an exhaust valve connected to the exhaust channel;
   an exhaust end fitting through which the air passing through the exhaust valve passes and which is provided with a mesh;
   a gas discharge channel configured to communicate with an inside of the fermentation container;
   a gas discharge valve connected to the gas discharge channel;
   a gas discharge end fitting through which a gas passing through the gas discharge valve passes and which is provided with a second mesh;
   a first fitting connection channel configured to connect the gas discharge valve to the gas discharge end fitting;
   a pressure release valve connected to the gas discharge channel, the pressure release valve being selectively opened and closed with respect to the gas discharge valve;
   a pressure release end fitting through which a gas passing through the pressure release valve passes and which is provided with a third mesh; and
   a second fitting connection channel configured to connect the pressure release valve to the pressure release end fitting, wherein a noise reduction device comprising at least one of an orifice or a muffler is provided in the second fitting connection channel.

8. The beverage maker according to claim 7, further comprising a third fitting connection channel configured to connect the exhaust valve to the exhaust end fitting.

9. The beverage maker according to claim 7, wherein an air supply channel connection portion to which an air supply channel is connected is provided in the fermentation lid.

10. The beverage maker according to claim 7, wherein a gas discharge channel connection portion to which the gas discharge channel is connected is provided in the fermentation lid.

* * * * *